United States Patent

Margolien

[15] 3,686,990
[45] Aug. 29, 1972

[54] CUTTING ELONGATED STOCK
[72] Inventor: David H. Margolien, Lexington, Mass.
[73] Assignee: Geometron Company, Inc., Lexington, Mass.
[22] Filed: March 5, 1970
[21] Appl. No.: 16,792

[52] U.S. Cl. ........................83/409, 83/437, 83/473, 83/489, 83/522, 83/581
[51] Int. Cl. ..............................................B26d 7/06
[58] Field of Search........83/409, 437, 488, 581, 489, 83/473, 522; 51/216.6; 214/1.5, 1.6

[56] References Cited

UNITED STATES PATENTS

| | | | |
|---|---|---|---|
| 3,342,107 | 9/1967 | Margolien | 83/581 UX |
| 933,088 | 9/1909 | MacBeth | 83/409 |
| 1,863,005 | 6/1932 | Campbell | 83/409 |
| 3,457,817 | 7/1969 | Turnbull et al. | 83/522 |
| 1,179,474 | 4/1916 | Thomas | 83/409 X |
| 1,371,324 | 3/1921 | Nelson | 83/409 X |
| 1,445,796 | 2/1923 | Paxton | 83/409 X |

*Primary Examiner*—Frank T. Yost
*Attorney*—Wolf, Greenfield and Sacks

[57] ABSTRACT

An improved technique for cutting the end of elongated stock at a selected angle to the longitudinal axis of the stock. The machine includes a chuck for securing and supporting the trailing end of the stock. The chuck is mounted for movement along a rail to advance the leading end of the stock along its longitudinal axis to a cutting station. The chuck includes an arrangement for precision advancement along the rail and for measuring accurately the distance through which the chuck and its supported stock are advanced. The chuck also is rotatable to enable the angular position of the stock to be adjusted about its longitudinal axis. The degree of angular rotation of the chuck is controlled and measured precisely by a protractor which is rotatable with respect to the chuck to enable the protractor to be set to a fixed reference index. The protractor thereafter is secured to the chuck for rotation in unison therewith and provides a precise indication of the angle through which the chuck and the stock has been rotated. A cutting unit having a cutter blade is located at the cutting station and is mounted for movement toward and away from the stock along a cutter descent axis which is perpendicular to the longitudinal axis of the stock. A dual vise arrangement is provided for holding the stock on both sides of the region where the cut is to be made. The cutting blade, which lies in a vertical plane, is adjustably rotatable about the cutter descent axis to vary the angle which the blade makes with the stock. The cutting blade is part of a cutting unit which is mounted to a supporting post for movement toward and away from the cutting station. The supporting post is located in a position which enables the cutter blade to be rotated through its full range of angular positions without directing swarf toward the post or any other portion of the machine. Additionally, the cutting unit is counterbalanced so that the operator need only apply minimal force to urge the cutter downwardly toward and through the elongated stock. The machine also includes an improved arrangement for marking the protractor and the scale which indicates the position of the cutting unit above the cutter descent axis. These improvement scales are adapted to enable a relatively simple programmed series of steps to be provided to the operator for cutting relatively complex parts. Gauges and limit stops also are associated with the counterbalanced cutter unit to enable the operator to control accurately and repetitively the depth of cut.

7 Claims, 19 Drawing Figures

INVENTOR.
DAVID H. MARGOLIEN

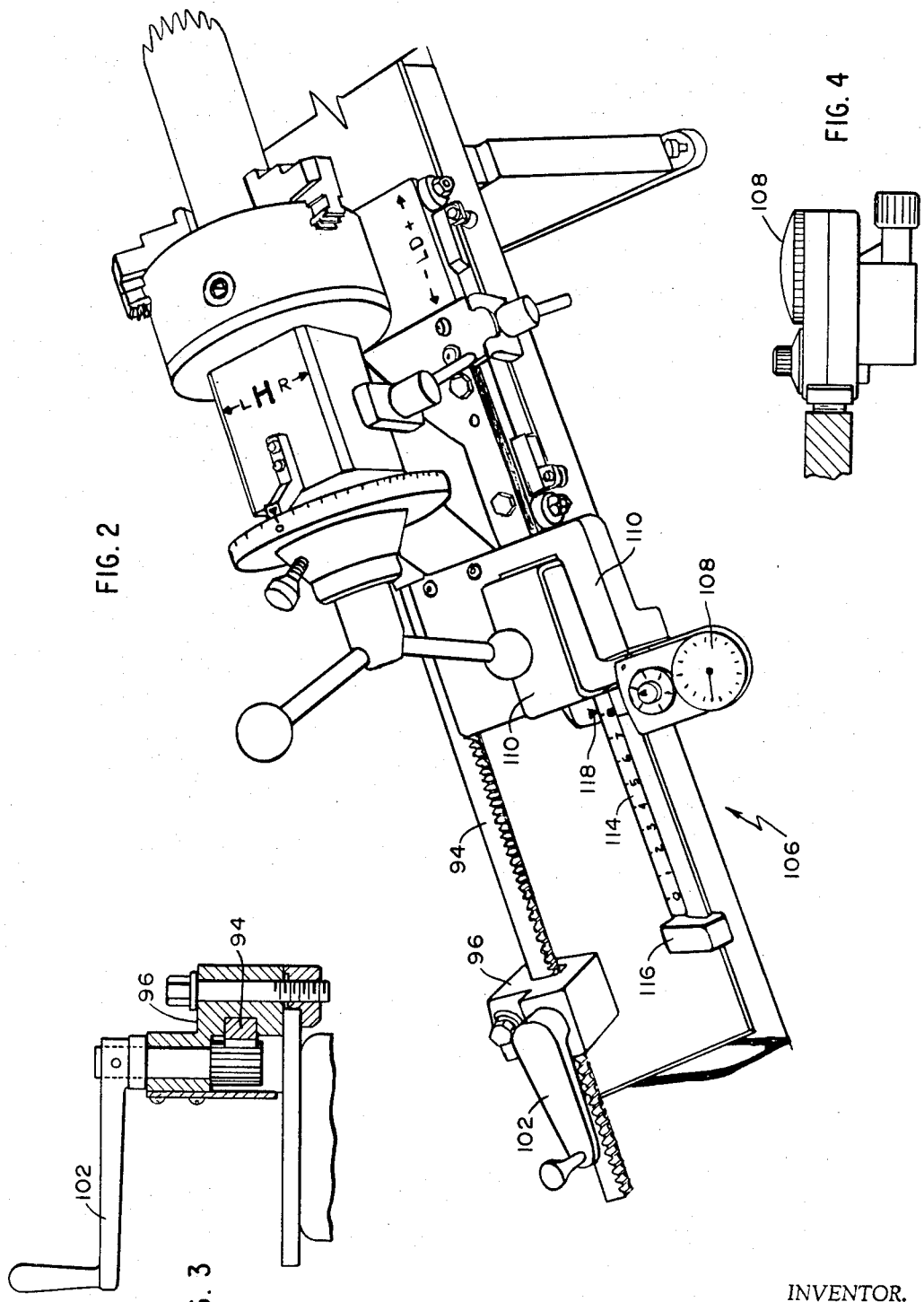

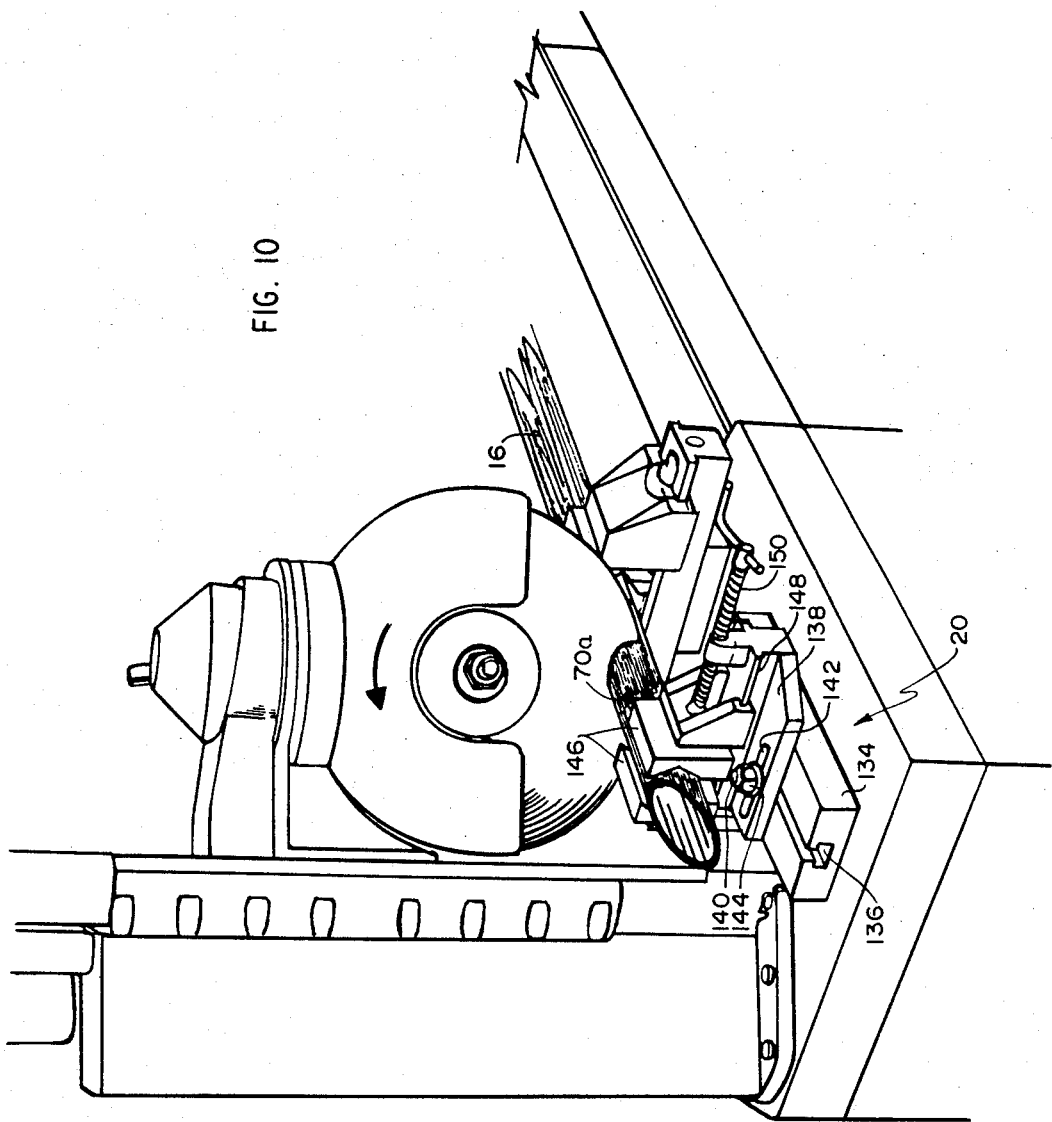

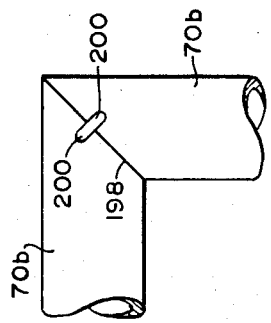
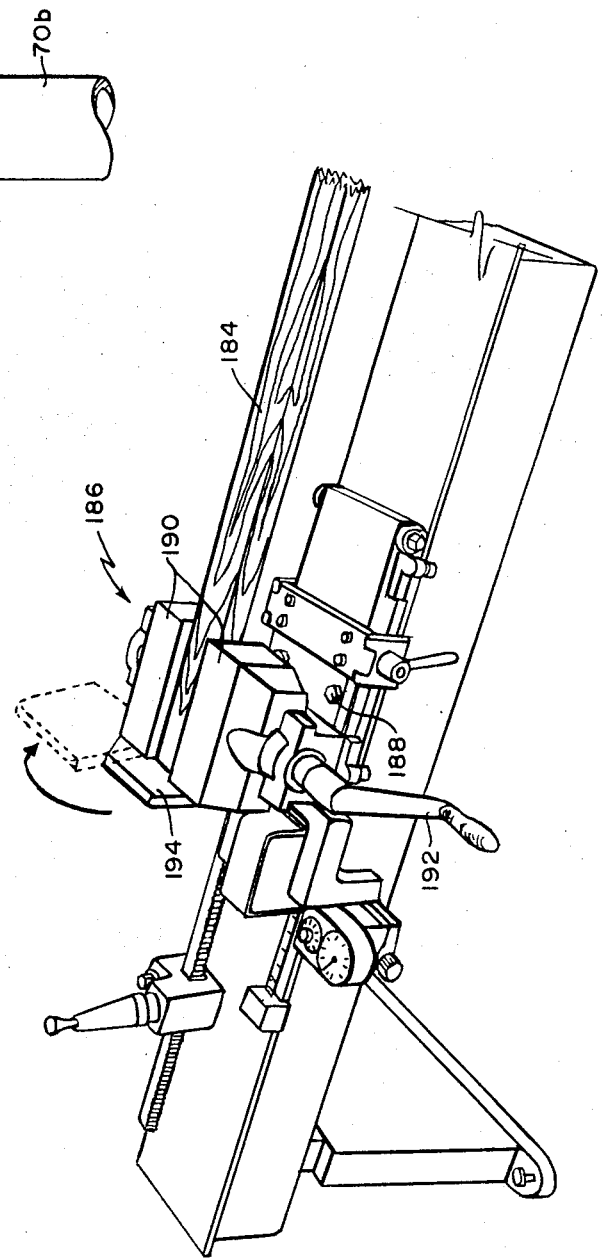
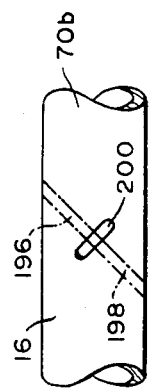
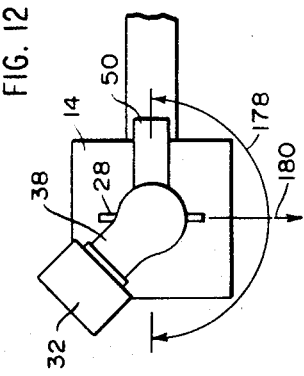

CUTTING ELONGATED STOCK

BACKGROUND OF THE INVENTION

This invention relates to machines for cutting or milling the ends of an elongate stock and, more particularly, to cut-off machines of the type described in U.S. Pats. Nos. 3,263,544 and 3,342,107. The machine may be employed to cut a segment from a length of elongated stock in which the ends of the cut segments are disposed in selected planes or are otherwise shaped to be mated with precision to another part. In most instances the other part to which the segment is mated is, itself, a segment which has been cut in a precise manner from a similar length of elongated stock. The segments may be used to construct any number of constructions such as pipe joints, structural braces and the like which require the segments to be joined accurately. The joints may be relatively simple such as an elbow in which the mating ends of the segments each are cut at a 45° angle to their longitudinal axes. This requires a simple, single cut to be made along a single plane at the mating ends of each segment. Segments also may be cut to produce a more complicated joint which may consist of a plurality of segments joined at a common juncture and which radiate from the common juncture. In such more complicated joints, the connected end of each segment must mate with the ends of two or more other segments which requires that the mating ends of the segments be cut along a plurality of planes. The precision required to fabricate and cut the mating ends of segments used in such a cluster joint must be controlled more critically than the segments which mate to form a simple elbow joint. If only one of the mating end surfaces of one of the segments is oriented improperly, the error in orientation will effect the orientation of the other mating ends of the other segments and thus will destroy the proper relative alignment of the segments in the cluster. The error introduced by one improperly oriented mating end is cumulative throughout the joint. For these reasons it is essential that the machine is capable of cutting the stock along precisely controlled planes. It is among the primary objects of the invention to provide a machine which enables such precise control.

In addition to providing precise control as to the angle or angles of the cuts made in the end of the segment it is equally important that the segment be cut to a precise and controlled length. In prior devices the length of each segment has to be measured by the operator of the machine, such measurement being made from the extreme ends of the segment. Accurate measurement in this manner is quite difficult, particularly when the ends of the segment are cut at an angle to the longitudinal axis. In the machines described in the aforementioned U.S. Patents a scale is provided along the length of the rail over which the stock is advanced. In order to determine the length of the segment which is to be cut and which projects beyond the cutting unit the operator must first note the original position of the chuck along the scale and then must calculate the distance which the chuck and work piece must be advanced along the scale to produce a segment of the desired length. Although this arrangement is capable of producing quite accurate results, it, nevertheless, does require a considerable amount of skill on the part of the operator in order to determine just how far the chuck and stock must be advanced in relation to the fixed scale. My invention avoids the requirement for calculating the necessary advancement of the chuck along the rail by providing a gauging arrangement which measures the extent of longitudinal advancement of the stock past the cutter blade from a zero reference and which provides a direct read out of the distance which the chuck has been advanced.

When cutting the segments from the elongated stock, the stock is weakened as the cutting operation progresses. Because of this the stock may tend to bend at the cut region so that the longitudinal axis of the stock and that of the segment become misaligned. If the segment being cut becomes misaligned with the remaining portion of the elongate stock, the accuracy of the cut and of the segment will be impaired. My invention includes an arrangement for gripping the projecting segment to be cut to insure its proper alignment with the trailing, elongated stock throughout the cutting operation.

A further difficulty inherent in prior techniques resides in the proper alignment and assembly of the segments after they have been cut, even when the cuts have been made with satisfactory precision. In current techniques the fabricator simply places the mating parts of the segments against each other and aligns them visually. He then may place the visually aligned parts in a jig to secure them in the mated configuration while they are being fastened to each other as by welding or other fastening techniques. The invention provides a technique for marking the edges of surfaces which are to be mated to provide a guide or fixed visual reference which enables the operator to mate the parts with the required accuracy.

Another difficulty in prior machines is that they are arranged so that, in some instances, the swarf is ejected partly toward the operator or toward a part of the machine from which it may ricochet and injure the operator. The machine disclosed herein is designed to eliminate this possibility by locating the structural parts of the machine and the cutting unit so that the swarf is never ejected toward the operator or a machine part. Instead, the swarf may be ejected toward a receptacle, such as a vacuum inlet which ingests all of the swarf, thus maintaining the area clean.

In currently available cut off machines the operator must possess considerable skill, particularly in regard to setting the machine to make a particular cut in the stock. It is necessary frequently for the operator to perform a number of mathematical calculations in order to set the various components of the machine to effect a particular cut. In the instant invention, the operator need not perform any mathematical calculations and may be provided with a program of relatively simple instructions. The various measuring scales associated with the machine are arranged to permit the use of such relatively simple pre-programmed instructions.

SUMMARY OF THE INVENTION

The various aspects of the invention are embodied in a cutting machine of the type described in the aforementioned U.S. Pat. Nos. 3,263,544 and 3,342,107. These machines include an arrangement by which a cutting member, such as a circular saw blade or abrasion cutter, is mounted for translation along a vertical axis with the blade being rotatable about a horizontal axis. The elongate stock is supported with its longitudinal axis perpendicular to the vertical axis of the cutter blade in a position below the cutter blade so that as the cutter blade advances downwardly, it may engage and cut through the stock at the cutting station. The cutting blade is advanced perpendicularly to the longitudinal axis of the stock at all times. The angle at which the cutting blade cuts the stock may be varied and controlled by rotating the blade to various positions about its vertical, translatory, cutter descent axis. A scale is provided to indicate the angle of the blade about the vertical axis. The scale is divided into designated quadrants which facilitate a simplified programming technique for instructing the operator of the machine.

In addition to the variable angle of the cutter disc, the chuck is rotatably mounted to the carriage so that it may rotate the stock about its longitudinal axis. This provides an additional variable which permits the stock to be cut in relatively complex configuration.

The elongate stock is supported at one end by a chuck which, in turn, is supported on a carriage movable lengthwise along a rail toward and away from the cutting station. The other end of the stock extends longitudinally toward the cutting station and means are provided at and about the cutting station to grip the stock firmly.

One aspect of the invention relates to an improved arrangement for gripping the leading end of the stock which is to be cut. This arrangement is an improvement over prior machines which provide a vise which grips the stock firmly near the region where it is to be cut between the cutting wheel and the trailing end of the stock. Although this arrangement generally will provide sufficient rigidity for a single cut which severs the leading segment from the trailing portion of the stock, it is inadequate where a number of cuts are to be made at the same location in the stock, particularly when some of the multiple cuts only extend part way through the stock. Because a partially cut region will be weakened somewhat, it may flex or otherwise deform during the subsequent cutting operations, which may result in imprecise orientation of the relative planes on the finally cut segment. This is overcome in the instant invention by providing a secondary, floating vise which is located beyond the cutting wheel and which grips firmly the forwardly projecting segment of the stock. The floating vise cooperates with the main vise to grip the stock firmly on both sides of the cutting station. By providing support on both sides of the location of the cut, deformation or misalignment of the trailing portion of the stock and the leading segment is precluded. As the cuts are made and the stock is rotated to a new angular position in readiness for the next cut, the weakened stock still is held rigidly on both sides of the cut region.

Another aspect of the invention relates to an improved arrangement for measuring and gauging the length of the segment which is cut from the leading end of the stock. This includes a linear measuring device which is mounted to the carriage for movement in unison with the chuck and, therefore, the stock. The linear measuring device is engagable with the rail on which the carriage moves and may be reset to fixed reference, such as a "zero" indication, after the leading end of the segment to be measured has been cut at its leading end. All of the vises then are released, and the carriage is advanced toward the cutting station to advance the leading end of the stock past the cutter descent axis. The lengthwise measuring device which is in engagement continually with the rail provides an accumulated reading of the distance through which the carriage has been advanced. This distance is equal to the distance which the leading segment projects beyond the cutting station. The distance through which the carriage, chuck and stock have advanced may be controlled accurately and precisely by the linear measuring device, which is extremely accurate and which can provide resolution of the order of one one-thousandth of an inch.

The machine also includes an improved arrangement for advancing the carriage along the rail in a positive and controlled manner. For this purpose, a rack and pinion arrangement is provided in which the rack is secured to and extends rearwardly of the carriage into engagement with a pinion rotatably mounted within a housing. The pinion block may be locked to the rail at any position along the rail. A crank is connected to the pinion so that once the block has been locked to the rail, rotation of the crank and pinion will advance the rack and carriage forwardly or rearwardly along the rail to the desired position. The linear measuring device provides an accurate indication of the extent of carriage advancement even if some backlash exists between the rack and pinion.

Yet another aspect of the invention resides in the mounting of the scale which measures the angle of rotation of the chuck and stock about the longitudinal axis of the stock. The angular position of the stock is very important and must be controlled carefully if precision is to be achieved in the angular relation between the cuts made through the stock. This improvement includes a circular disc marked about its circumference to form a protractor. The disc is rotatable freely about the axis of the chuck past a reference index which is fixed to the carriage. Before any cuts are initiated in the stock, the protractor is rotated so that the zero position is in registry with the reference index. The protractor then is locked firmly to the chuck for rotation in unison with the chuck and the stock. This provides a constant indication of the angular position of the stock in relation to the original position of the stock. The scale on the protractor is divided into distinct segments which are marked to facilitate a simplified programming technique for instructing the operator in making a particular series of cuts.

A further aspect of the invention is directed toward the general location of the structural parts and cutting unit of the machine. The cutting unit is supported by a main post on which the cutter unit moves vertically along the cutter descent axis. The post is located with respect to the cutter and vise so that the cutter may be oriented to any desired angle with respect to the work piece, but which insures that the swarf will not be directed toward the post or the operator. This provides an important safety feature for the operator. Additionally, the elimination of any obstructions to the ejected swarf enables a receptacle, such as a vacuum scoop or other swarf collector, to be positioned to receive the swarf without interference from any parts of the machine. This enhances desired cleanliness of operation.

A further aspect of the invention relates to the operator control for advancing the cutting unit vertically toward and away from the stock with minimal effort but with positive control. The cutting unit is relatively heavy and is counterbalanced and biased slightly in an upward position. A relatively light yet firm effort is required by the operator to cut through the stock. The counterbalancing arrangement also provides more of sensitive feel for the operator as the blade cuts through the stock.

Among the objects of the invention is to provide a cut off machine which is adapted particularly to cut the end of an elongated stock precisely and accurately even when the end to be cut is of relatively complex configuration.

A further object of the invention is to provide a cut off machine of the type described which enables an operator to cut relatively complex parts for elongate stock with relatively simple instructions from a designer and which requires no mathematical calculation on the part of the operator.

A further object of the invention is to provide an improved arrangement for controlling the length of segment which is cut from the elongate stock.

Still another object of the invention is to provide an improved arrangement for gripping the elongate stock in the region where it is to be cut.

A further object of the invention is to provide a cut off machine in which the swarf is never directed toward the operator or toward a structural element of the machine.

DESCRIPTION OF THE DRAWINGS

These and other objects and advantages of the invention will be more fully understood from the following detailed description thereof with reference to the accompanying drawings wherein:

FIG. 2 is a perspective view of the chuck, carriage and arrangement for advancing and measuring the extent of advancement of the carriage;

FIG. 3 is a cross sectional view taken through the pinion housing as viewed along the line 3—3 of FIG. 2;

FIG. 4 is a cross sectional view of the linear advancement indicator as viewed from the plane 4—4 of FIG. 2;

FIG. 10 is a perspective view of the cutting unit and multiple vise arrangement;

FIG. 12 is a somewhat schematic, plan view of the machine;

FIG. 13 is a perspective illustration of a vise which is mounted on a carriage in substitution for the chuck and to secure non-circular stock;

FIG. 14 is an illustration of a portion of the elongate stock which is to be cut and showing the location of an orientation notch formed in the stock before the cut is made;

FIG. 15 is an illustration of a pair of segments joined at an elbow and showing the manner in which the registration notches are employed to align precisely the segments;

FIG. 1 shows the machine having a main frame, indicated generally by the reference character 10, which supports the cutting unit, indicated by the reference character 12. The main frame 10 includes a generally flat table 14 over which the work piece, such as the elongate stock 16, is located during the cutting operations. The leading end of the work piece 16 is gripped securely in its position over the table 14 by means of a primary vise 18 and secondary, floating vise 20. The rearward, trailing end of the elongate work piece 16 is gripped securely by a chuck 22 which is supported for forward-rearward movement along a rail 24 by means of a carriage 26. The rail 24 extends along a forward-rearward direction for a considerable length to enable the machine to handle relatively long stock which may be 25 feet or more in length.

Figure 1:
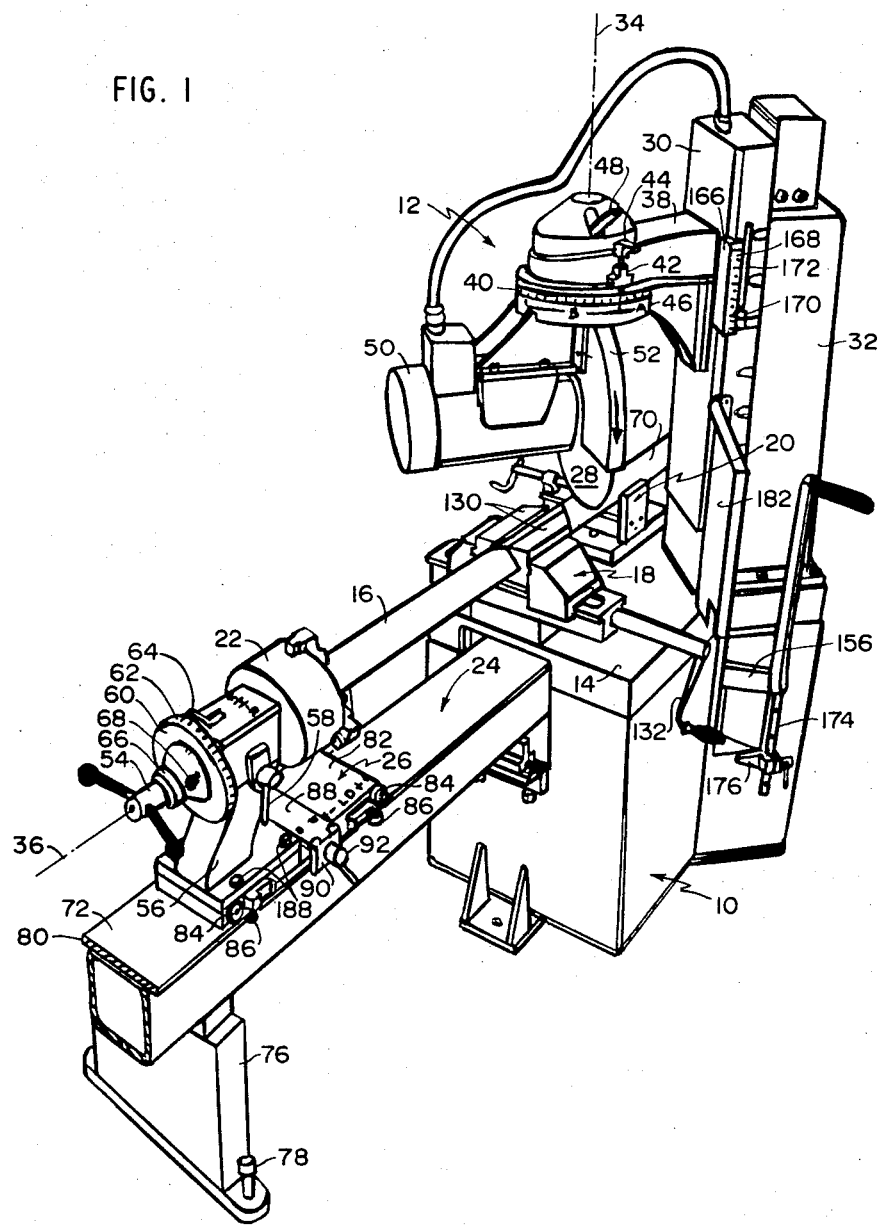
FIG. 1 is a perspective view of the machine with a portion of the rail removed.

In the illustrative embodiment of the invention the cutting unit 12 includes a circular cutting disc 28 which may be of an abrasive character or saw tooth design depending on the material of the work piece. Although in most instances the circular cutting disc 28 will be preferred, other cutting devices may be employed such as band saws, cutting torch etc. The cutting unit 12 is supported directly above the longitudinal axis of the work piece and is mounted for heightwise movement toward and away from the work piece by a slide 30 which is mounted for vertical sliding movement to a rigid post 32 fastened securely to and extending upwardly from the base 10. The cutting unit 12 is disposed above the table 14 so that it moves along a vertical cutter descent axis 34 which is perpendicular to and intersects the longitudinal axis 36 at the cutting station. The cutter descent axis 34 also passes diametrically through the cutting wheel 28, which is maintained in a vertical plane at all times. This arrangement insures that as the cutting disc 28 engages and is advanced through the stock 16, it will advance through the stock along a direction that is perpendicular to the longitudinal axis of the stock 16. As described more fully in the aforementioned U.S. Pats. Nos. 3,263,544 and 3,342,107, this technique for engaging and advancing the cutter disc 28 through the work piece 16 permits greater cutting accuracy to be achieved. It also reduces the forces imposed on the cutting disc 28 and the work piece and provides an arrangement by which the length of the cut work piece may be controlled more accurately than in prior cutting devices.

Also, as described in the aforementioned U.S. patents, the cutting unit 12 is supported for rotation about the vertical cutter descent axis 34 to permit cuts to be made along a plane which lies at a selected angle to the longitudinal axis of the workpiece 16 and along a direction in which the cutting disc enters the stock from a direction that is perpendicular to its longitudinal axis. In the illustrative embodiment of the invention, this arrangement includes a supporting arm 38 which is fastened rigidly to the slide 30 and which projects over the table 14. The cutting unit 12 is mounted rotatably to the end of the supporting arm 38 for rotation about the cutter descent axis 34. As described more fully herein the cutting unit also includes a special scale 40 which rotates in unison with the cutting unit past a fixed reference index 42 located on the supporting arm 38. The device also may include a spring biased detent 44 mounted to the supporting arm 38 which cooperates with a number of holes (not shown) formed in the plate 46 which rotates with the cutting unit 12. The holes are spaced angularly about the plate 46 to enable the cutting disc 28 to be rotated and positioned in a number of planes which make commonly employed angles with the longitudinal axis of the stock (30°, 45°, 60°, 90°, etc.). In addition to the detent for common angles, the cutting unit may be locked in any other desired angle about the cutter descent axis 34 by a lock which may be operated by the hand lever 48. Any number of locking arrangements operable by a hand lever and which are well-known in the art may be employed.

The cutting unit 12 also includes a motor 50 secured rigidly and depending from the circular plate 40. The cutting disc 28 is secured to the shaft of the motor 50. A guard 52 preferably is disposed about a substantial portion of the cutting disc 28.

In addition to the rotational adjustment of the plane of the cutting disc 28 to vary the plane angle at which the stock 16 is cut, the machine also includes an arrangement by which the workpiece 16 may be rotated to various angular positions about the longitudinal axis 36. By controlling the angle of the cutting wheel 28 about the cutter descent axis 34 and also the angular position of the stock 16 about its longitudinal axis 36, a number of cuts may be made in the workpiece along planes which lie at various angles to each other. Opposite ends may be cut at opposite angles or multiple angles may be made on the same end of the cut stock. Although the end of a finally cut segment of stock may appear as a relatively complex and compound angle, this angle may be cut along a series of planes by orienting properly the angular relationships between the cutting disc 28 about the cutter descent axis 34 and the angular orientation of the stock 16 about its longitudinal axis 36. In this manner, any compound angle may be reduced to a number of planes along which may be cut by the machine. As described more fully below, this arrangement together with the improved angular measuring devices for controlling the angles of the cutting disc plane and rotation of the stock 16 simplify greatly the instructions which the operator must follow when cutting a particular workpiece, irrespective of the apparent complexity of the cuts being made in the workpiece.

The stock 16 is rotated about its longitudinal axis 36 by the chuck 22 into which the trailing end of the stock 16 is butted firmly and gripped securely. The chuck 22 is secured to a spindle 54 which, in turn, is rotatably supported about its longitudinal axis 36 on a chuck support 56. The chuck support 56, in turn, is mounted detachably to the carriage 26 for movement along the length of the rail 24 as described below. The chuck 22 and spindle 54 are freely rotatable and may be locked in any desired angular position about the axis 36 by the hand locking lever 58 which locks the spindle 54 to the chuck support 56.

The extent of angular rotation of the chuck 22 and, therefore, the workpiece 16, is measured by a protractor disc 60 which is marked, in degrees, along a scale 62 disposed about the periphery of the disc 60. The scale 62 cooperates with a fixed reference index 64 which is mounted to the chuck support 56 adjacent to the scale 62. The protractor disc 60 is freely rotatable about the spindle 54 and is retained in place on the spindle by means a collar 66 which is secured to the spindle. The protractor disc 60 may be locked in any rotational position with respect to the spindle 54 by a locking screw 68 which passes through a portion of the disc 60 and engages a portion of the spindle 54. With this arrangement, the operator may secure the trailing end of the stock 16 within the chuck without taking any special precautions to insure that the stock 16 is disposed in any particular desired angular relation about the longitudinal axis 36. Once the stock has been secured in the chuck and has been gripped by the vise 18, the protractor disc 60 is rotated to register its " zero" calibration with the fixed reference index 64. The disc 60 then is locked in this position to the spindle 54 by the locking screw 68 so that it will rotate thereafter in unison with the chuck and workpiece 16. By permitting such "zero" reference adjustment of the protractor scale 62 any subsequent rotation of the stock to a desired angular position about its longitudinal axis 36 may be made simply and without calculations. The scale 62 may be marked in degrees and fractions thereof from 0° to 360° or, as in the preferred arrangement described more fully below, may be marked in two segments of 0° to 180° each. This arrangement provides a simple and accurate indication of the angular position of the workpiece 16 about its longitudinal axis 36.

The machine is adapted to cut a long length of stock 16 into a number of segments, indicated generally by the reference character 70. In addition to controlling the various plane angles at which the cutting disc 28 cuts the stock, precision control of the longitudinal dimension of the segment also is critical. This is true particularly when a number of segments are to be joined with their angularly cut ends in abutting, mating relation to each other. If one of the segments is of improper length, the error will be transmitted to all of the other segments and mating portions thereof, thus magnifying the error. When the mating ends of the segments are of more complex, multiple cut configuration, an error in length of one of the segments is amplified even further. Indeed, in many multiple cut, compound-angle configurations any slight error may destroy completely proper alignment of the segments. Because of the difficulties previously encountered in controlling accurately the angle of cuts and the length of the finally cut segment, many multiple cut, compound angle assemblies have not been able to be fabricated in a machine but had to be fabricated manually at great expense and by highly skilled technicians.

As shown in FIGS. 1 and 2, the rail 24 includes an elongate flat plate 72 which is supported on a rail support 74. The rail support 74, in turn, is supported by a number of supporting feet 76 which are disposed in spaced relation along the length of the rail support 74. The supporting feet 76 preferably are provided with leveling screws 78 to permit the rail 24 to be adjusted in a horizontal position. The widthwise edges 80 of the rail plate 72 extend transversely beyond the rail support 74 to define overhanging margins which extend along the length of the rail plate 72. The margins are employed to guide the carriage 26 along the length of the rail 24 and to permit the carriage to be locked firmly to the rail 24.

The carriage 26 includes a base plate 82 which has rollers 84 rotatably mounted to the plate 82 at its forward and rearward ends. The rollers 84 support the plate 82 so that it is spaced heightwise from the rail plate 72. The carriage 26 is guided for movement along the length of the rail plate 72 by means of guide rollers 86 which are secured to the base plate 82 for rotation about a vertical axis and which engage the edges 80 of the rail plate 72. The carriage 26 and chuck 22 may be rolled along the rail plate 72 to any desired position. The carriage 26 may be locked in any desired position along the rail plate by means of a clamp, indicated generally by the reference character 88, which is secured to the plate 82. The clamp 88 has a pair of gripping plates 90 which are pivoted near the widthwise edges of the base plate 82 and which extend downwardly below the edges 80 so that the gripping plates may be drawn toward the edges 80 of the rail plate 72. The gripping plates are locked against the edges 80 of the rail plate 72 by a locking bolt 92 which extends transversely between the base plate 82 and rail plate 72, the locking bolt 92 being screwed into one or both of the gripping plates 90.

One aspect of the invention includes an improved arrangement for advancing the carriage 26 along the rail and for measuring accurately the extent of advancement of the carriage by controlling accurately the linear advancement of the carriage 26. The length of the segment 70 which projects beyond the cutter descent axis 34 similarly may be controlled accurately. The mechanism for advancing the carriage 26 along the rail 24 is shown more clearly in FIGS. 2 and 3 and includes a rack 94 which is secured to one side of the carriage 26 and which extend rearwardly therefrom along the margin of the rail plate 72. A floating clamp 96 is provided in association with the rack 94 which passes through the hole formed in the clamp body 96. A pinion gear 98 is rotatably mounted within the clamp body 96 for engagement with the rack. The pinion gear 98 is driven by a shaft 100 which protrudes upwardly through the clamp housing 96 and which is connected to a manually operated crank handle 102. The clamp 96 includes a portion which embraces the laterally extending margin of the rail plate 72 by a clamping screw or bolt 104 which is tightened to clamp the housing against the laterally extending margin of the rail plate 72. Once the floating clamp 96 has been secured firmly to the rail 72 the operator may turn the crank handle 102 to advance the carriage forwardly or rearwardly along the length of the rail 24 with positive control.

The extent of advancement of the carriage and, therefore, the stock is controlled and measured accurately by a "zero-reference" linear measuring device 106 shown in FIG. 2. This device is mounted to the carriage 26 and cooperates with the rail plate 72 to provide an accurate indication of the linear distance through which the carriage 26 has been moved along the rail 24. Each time the carriage 26 is advanced along the rail, the measurement of the extent of that advancement is made from a new zero-reference. This enables the distance to be determined without requiring mathematical calculations on the part of the operator. The extent of measurement is read out directly from the linear measuring device. As shown in FIG. 2 the device includes a traveling indicator 108 which is mounted to the rearward end of the carriage 26, as by the bracket 110. The traveling indicator 108 includes a gage wheel 112 (see FIG. 4) which engages frictionally the widthwise edge 80 of the rail plate 72 at all times. Any movement of the indicator 108 lengthwise of the rail 24 will cause the frictionally engaged gage wheel 112 to be rotated, the extent of rotation of the wheel being readable directly on the read out scale of the indicator 108 in linear measurement. Traveling indicators of this type are available commercially and, for example, may be obtained from Southwestern Industries, Los Angeles, California. The indicator 108 preferably is selected to provide a high degree of resolution which may be of the order of 0.001 inches. This high degree of resolution is suitable in most instances to provide sufficient accuracy in the length of the segment to be cut to be sure that it may be mated thereafter properly with other segments. Additionally, the movement of the carriage 26 along minute, incremental lengths such as one or two thousandths of an inch may be controlled carefully by the rack and pinion arrangement described above which permits minor adjustments in the position of the carriage along the rail to be made with relative ease. In the preferred technique of using this device, the indicator is reset to zero before the carriage is moved. Any reading thereafter on the indicator will provide an accurate indication of the extent through which the carriage has been advanced.

In the machine described, the traveling indicator 108 is used in conjunction with a coarse scale such as the tape measure 114 which provides a rough indication of the extent of carriage advancement. The use of the coarse scale is desirable particularly when the stock is relatively long and is to be advanced longitudinally over a relatively large distance. Currently available traveling indicators of the type described are designed to operate over a relatively short distance, as 6 inches. For example, in a 6-inch indicator, the operator must keep track of the 6-inch increments and must add them to determine the full extent of advancement. By providing the relatively long, continuous, coarse tape scale, the operator need not perform any calculations. The combined use of the coarse tape and relatively fine traveling indicator provides results with a high degree of resolution. The coarse scale of the tape measure 114 is employed by securing the "zero" end of the tape to rail, as by the magnet 116 or other clamp. Before the carriage is advanced the magnet is secured to the rail so that the zero indication on the tape is in registry with a fixed reference index 118 on the bracket 110. With the zero end of the tape measure 114 thus secured, the advancement of the carriage 26 will cause the tape measure 114 to unroll from a spring-loaded spool contained within a housing 120 which also is secured to the bracket 110. The fixed index 118 thus advances past the fixed, but unrolling indicia on the tape measure 114 to provide a coarse indication of the extent of carriage movement.

Figure 5:
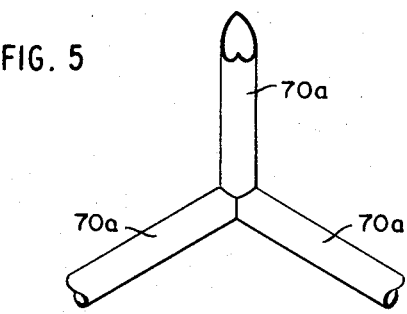
FIG. 5 is an illustration of a cluster joint which may be fabricated from the segments cut in the cut off machine and in which the segments lie along mutually perpendicular axes.
Figure 6:
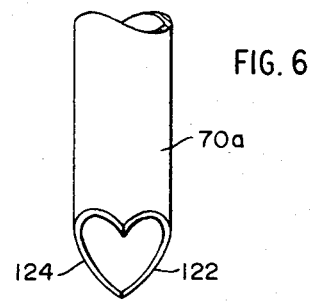
FIG. 6 is a plan view of one of the mating ends of the segments shown in the cluster of FIG. 5.
Figure 7:
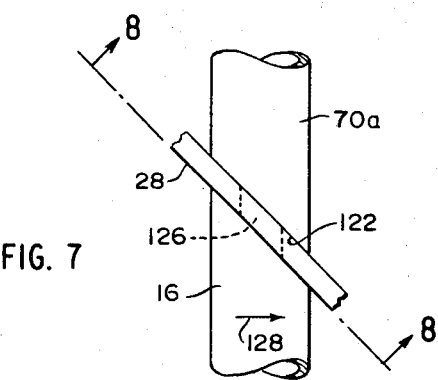
FIG. 7 is a somewhat diagrammatic plan view of the manner in which the mating end of the segment shown in FIG. 6 is cut.
Figure 8:
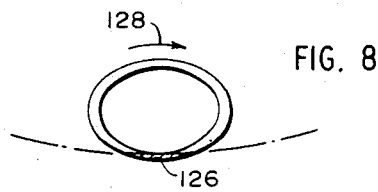
FIG. 8 is an illustration of the location of the cutting wheel and stock as viewed from the plane 8—8 of FIG. 7.
Figure 9:
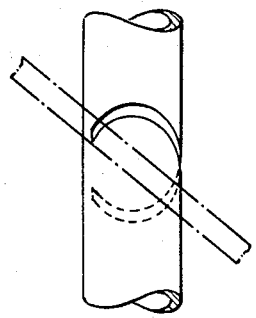
FIG. 9 is a plan view similar to that of FIG. 7 illustrating the relative position of the stock and cutting wheel after the stock has been rotated into position in readiness for the second cut.

Another aspect of the invention resides in the provision of the improved vise arrangement for gripping the stock 16 and segment 70 to be cut on opposite sides of the region where the cut is to be made. This is important particularly when the trailing end of the segment 70 is made in a number of cuts to define a "compound angle." When making the compound angle trailing end of a segment 70, the initial cuts may be made only part way through the stock so that the segment 70 and stock 16 remain attached along a generally narrow connective portion. This enables the stock 16 and segment 70 to be rotated in unison by the chuck 22 to a desired orientation which will present the stock 16 and segment 70 to the cutting blade 28 for the final cut which will sever completely the segment 70 while making the final cut at the desired angle. For example, this technique might be employed to fabricate a cluster of segments as shown in FIG. 5 in which the mating ends of the segments are cut to enable the segments 70a to be joined along three mutually perpendicular axes. As shown in FIG. 6, the mating end of the segments 70a requires that two cuts be made to form the surfaces 122 and 124. FIGS. 7, 8 and 9 show the orientation of the stock relative to the cutting disc 28 while making the sequence of cuts to fabricate the mating end shown in FIG. 6. FIG. 7 shows the stock 16 as viewed from the cutter descent axis 34 while the first cut is being made through the stock to form the surface 124. The cutting disc 28 is positioned about the cutter descent axis 34 so that the plane of the disc 28 makes an angle of 45° with the longitudinal axis 36 of the stock 16. The cutting disc 28 then is brought downwardly into and through the stock 16 but does not cut fully through the stock so that the connective portion 126 remains intact, the stock 16 and segment 70a remaining connected. (See also FIG. 8). By making the first cut to leave the connective portion 126, the stock 16 and segment 70a may be rotated in unison about the longitudinal axis 36 to present the stock 16 to the cutting disc 28 in the next angular position for the second cut. After the first cut has been made to form the surface 122 the stock is rotated along the direction indicated by the arrows 128 (clockwise as seen from the rearward end of the stock) to the position shown in FIG. 9. When fabricating the segment 70a for construction of the cluster shown in FIG. 5, the stock 16 is rotated through an angle of 90°. Additionally, when fabricating the illustrative segment, the angular setting of the cutting blade 28 about its cutter descent axis 34 need not be changed and may be retained at the same orientation as when making the first cut. The segment 70a is rotated 90° in unison with the stock 16 because of the connective portion 126 which was not severed by the cutting disc 28 during the first cut. When the stock 16 and segment 70a have been locked in this position, the cutting unit 12 is urged downwardly to cause the cutter disc 28 to cut fully through the stock. This severs the segment 70a completely from the stock 16 while forming the "compound angle" at the trailing end of the segment 70a.

In order to obtain the precision necessary in making the cuts so that the surfaces 122, 124 are disposed properly on the trailing end of the segment 70a and in proper angular relation to each other, it is essential that the segment 70a and stock 16 are maintained in perfect alignment along their common longitudinal axis 36 while each of the cuts are being made. This is important particularly while making the second, last cut because the prior cuts weaken the stock substantially in the connective region. Additionally, the connective portion 126 may be disposed in relation to the cutting disc 28 during the final cut so that the connective portion 126 will be severed before the final cut is completed. Unless properly supported, the segment 70a then will fall away from the stock 16 and the cut could not be completed In order to insure that the segment 70a and stock 16 are maintained in axial alignment along the longitudinal axis 36 during the full duration of each cut, a pair of vises 18, 20 are employed to grip firmly the stock 16 and the segment 70a on both sides of the cutting disc 28 while each cut is being made. The primary vise 18 is supported on the table rearwardly of the cutter descent axis 34 and is of self-centering construction as is well-known in the art. The vise 18 includes a pair of gripping jaws 130 which are movable toward and away from each other on opposite sides of the stock 16 by the operation of the crank 132. After the stock 16 has been positioned properly, the vise 18 is locked about the stock 16. The secondary, floating vise 20, which is supported on the table 14 forwardly of the cutter descent axis 34 then is clamped to the segment. As shown in FIG. 10, the secondary vise 20 includes a longitudinal mounting bracket 134 which may be fastened to the table 14 and which has an inverted T-shaped slot 136 formed along its length. A jaw slide plate 138 is supported on top of the bracket 134 and may be secured firmly to the bracket 134 in a position along its length by means of bolts 140 which extend upwardly from the T-shaped slot 136 and through transverse slots 142 formed in the slide plate 138. The heads of the bolts 140 are captured within the T-shaped slot 136 of the bracket 134. The transverse position of the slide plate 138 on the mounting bracket 134 may be adjusted within the limits defined by engagement of the bolt 140 with the transverse ends of the slot 142. When positioned properly in the desired transverse position, the slide plate 138 is locked to the bracket 134 by nuts 144.

One of the jaws 146 of the secondary vise is fastened to the slide plate 138, and the other is slidably mounted for transverse movement along the slide plate 138 by the guide flanges 148. The movable secondary vise jaw 146 may be clamped by a conventional clamping bolt 150 which is threaded through a portion of the slide plate 138 and is connected to the movable of the secondary vise jaws 146. After the stock 16 has been rotated to the desired angular orientation about its longitudinal axis 36, the primary vise 18 is clamped about the stock 16 and then the secondary, floating vise 20 is positioned about the segment and is clamped to the forwardly projecting segment 70a to insure that the segment 70a and stock 16 will be maintained in registry during the full duration of the cut and will not fall away once the connective portion 126 has been severed. Thus, the floating device is adjustable in two planes so that it may be moved close to the cutting station which will provide maximum support or may be moved to permit clearance of the cutting disc when the angle of cut is varied. Because the floating device is not clamped to the table until after it has been clamped to the segment 70a, it does not influence stock location.

Figure 11:
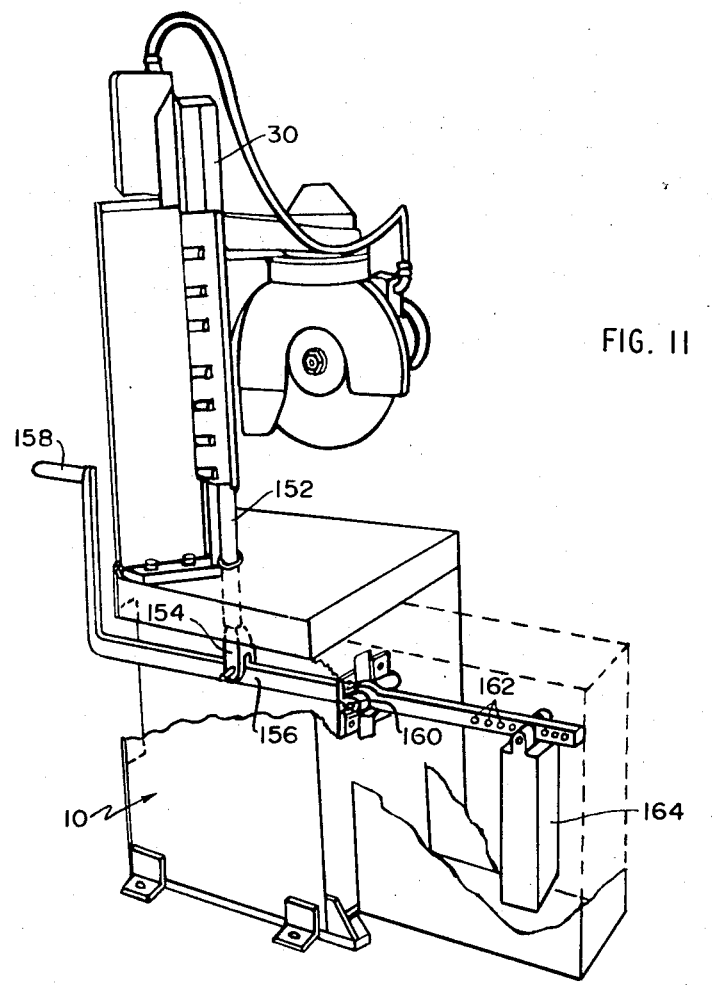
FIG. 11 is a perspective view of the counterbalancing of the arrangement for the cutting unit.

Another aspect of the invention relates to the mechanism for advancing the cutting unit 12 along the vertical cutter descent axis 34. As shown in FIG. 11, the slide 30 is connected, at its lower end, to a vertical rod 152 which has a fork 154 formed at its lower end. The fork 154 is pivoted to a transverse lever 156 between the operator's handle 158 and a pivot 160 at which the lever 156 is pivotally mounted to the base 10 of the machine. The lever 156 projects outwardly beyond the pivot 166 and has a number of holes formed along its length which enable a counter weight 164 to be positioned adjustably along the length of the projecting end of the lever 156. The counterweight 164 is selected and positioned to urge the lever 156 in a clockwise position as viewed in FIG. 11 to bias slightly the cutting unit 12 in a normally upward position. The biasing force preferably is such that the operator may urge the cutting unit 12 downwardly by pressing the handle 158 downwardly under a relative small force, preferably of the order of a few pounds. The relatively low force thus required by the operator to advance the cutting unit downwardly along the cutter descent axis 34 provides a more sensitive "feel" to the operator as the cutting wheel advances through the stock. Additionally, the operator's handle 158 preferably is located approximately at waist level for more comfortable operation and to reduce operator fatigue.

The mechanism for advancing the cutting unit 12 downwardly along the cutter descent axis 34 also includes a gaging and limitstop arrangement, shown in FIG. 1, to enable the operator to determine the depth of cut and to provide an adjustable stop to limit the advancement and depth of cut of the cutting blade 28 through the stock 16 as might be desired when a number of cuts are to be made repetitively and to the same depth. The gage 166 is fastened to the vertical slide 30 and has vertically disposed indicia 168 formed thereon. A movable reference index is mounted to the post 32 for vertical movement alongside the scale 168 on a vertical bar 172 in order to gage the depth of cut (advancement of the cutter blade 28 through the stock along the cutter descent axis 34). The stock 16 is positioned firmly in readiness for the cut and the cutting unit 12 is urged downwardly with the motor 50 turned off. When the cutting blade 28 bears against the stock, the sliding reference index 160 is moved along the bar 172 into registry with the "zero" reference on the scale 168. After the gage has been set to the zero reference, the depth of cut of the cutting disc 28 is displayed clearly to the operator by the position of the scale 168 in relation to the reference index 170.

The machine also includes a depth-of-cut limit stop which may be employed to limit the extent of downward advancement of the cutting disc 28 along the vertical descent axis 34, as might be desired when a number of cuts are to be made to a fixed depth in the stock. This arrangement includes a vertical slide bar 174 which is secured to the base 10 of the machine near the portion of the lever 156 which extends toward the operator. An adjustable stop 176 is slidably mounted for vertical movement along the length of the slide bar 174 and may be locked in any vertical position along the slide bar 174. A portion of the stop 176 projects below and into the path of movement of the lever 156 to limit the extent of downward travel of the lever 156 and, therefore, the cutting unit 12.

A further aspect of the invention resides in the orientation between the supporting post 32, slide 30, the cutting unit 12 and the arc through which the cutting unit may be swung above the cutter descent axis 34. The relationship of the elements is such that the swarf is ejected from the cutting unit along a path and in a direction which is not directed toward any parts of the machine, such as the post 32, or the operator. This enhances operator safety in that the likelihood of particles of swarf ricocheting toward the operator is minimized and, additionally, the ejection of swarf away from any of the machine parts permits a swarf collector, such as a vacuum inlet, to be positioned in alignment with the ejected swarf. This provides a clean operating environment which is desirable. As shown, somewhat diagrammatically, in FIG. 12, the cutting disc 28 is intended to be pivoted only within an arc of 180°, indicated at 178. The swarf which is ejected, for example, as shown by the arrow 180, similarly will be ejected in a direction lying within the arc 178. The machine includes no obstructions presented to the direction of swarf 1–0 throughout the full range of the arc 178. The post 32 which supports the cutting unit 12 extends from the post at an angle which is approximately 45° to the longitudinal center line 36 of the machine. By locating the post 32 in the corner, it is removed from the direction of swarf ejection 180 and also permits an operator to be disposed directly behind the cutting unit with a full unobstructed view of the workpiece and the cutting disc 28. Additionally, in the preferred embodiment of the invention, a safety door 182 (see FIG. 1) is hinged to the post 32 to protect the operator further and to provide a barrier between the operator and the cutting unit 12. When the cutting unit 12 is pivoted about the cutter descent axis 34 to a position in which the motor 50 extends generally toward the operator, the door 182 may swing toward the operator to provide clearance for the motor 50 yet to protect the operator from the cutting unit 12.

Although the invention has been described thus far in connection with elongated stock 16 of circular cross sectional shape, it may be employed with equal effectiveness to cut noncircular stock of either regular or irregular geometric cross section. In order to support and secure firmly the trailing end of the noncircular stock 184, a chuck 22 may be provided with an adapter designed especially to receive and grip the trailing end of the stock, or if rotation of the stock about its longitudinal center line 36 is not necessary, a butt-vise 186 may be substituted for the chuck as shown in FIG. 13. The butt-vise 186 is fastened to the carriage by the bolts 188 which also are employed to fasten removably the chuck 22 to the carriage 26. The butt-vise includes a pair of conventional self-centering jaws 190 which are clamped about the stock 184 by the vise handle 192. In order to register the trailing end of the stock 184 properly within the vise 186, an end butt plate 194 is pivoted to the rearward end of one of the self-centering jaws 190. When the butt plate 194 is used to provide a reference location for the trailing end of the stock 184, the plate is located as shown in solid in FIG. 13 in which the plate spans the rearward ends of the vise jaws 190. When the butt plate 194 is used, it is insured that any and each stock 184 which is placed in the vise 186 in abutment with the butt plate 194 will be cut in a length equal to all other stock registered against the butt plate 194, provided that the carriage 26 is maintained in its locked fixed position along the rail 24. The butt plate may be pivoted out of the way as shown in phantom in FIG. 13 to enable a larger length of stock 184 to be gripped between the jaws 190 with the trailing end of the stock 184 projecting rearwardly behind the vise 186.

Another aspect of the invention relates to a method of fabricating segments 70 to provide alignment notches on the cut end of the segment to enable that cut end to be mated in perfect registry with another segment also having similar alignment notches located adjacent its mating surface. Obviously even if the mating ends of the cut segment are formed perfectly, these ends still must be aligned by the fabricator or worker before the segments are secured together as by welding, etc. In most instances, the segments to be mated are aligned visually. With many shapes proper visual alignment is extremely difficult, and a slight error in alignment may have the same adverse effect as if the mating end or surface of the segment was not properly cut initially. In accordance with the invention, an alignment notch is made in the stock just before the cut is made. For example, FIG. 14 shows a section of stock 16 which is to be cut along the dotted region 196 at a 45° angle to the longitudinal axis of the stock 16. The resulting mating face 198 will lie in a single plane and is intended to be mated with a similarly cut segment 70b having an identical mating face 198 to form a right angle, or elbow, as shown in FIG. 15 in which the mating faces meet at 198. It is essential that the faces 198 of the segments 70b meet properly so that the remainder of the segments 70b also will be disposed properly in relation to each other and in relation to any other segments to which the segments 70b will be connected. Before the main cut 196 is made, an alignment notch 200 is formed on the outer surface of the stock by rotating the cutting unit 12 to an angular position about the cutter descent axis 34 which is 90° displaced from the plane along which the cut 196 is to be made. The cutting unit 12 then is moved downwardly toward the stock 16 and makes a slight cut in the outer surface of the stock. The cut should be deep enough so that a notch will be clearly visible. Although in some instances only one alignment notch 200 may be sufficient to facilitate registration of the subsequently mated segments, in the preferred technique the stock 16 is rotated about its longitudinal axis 36 180° and a second notch is formed diametrically opposite the first notch 200. After the alignment notches 200 have been cut in the outer surface of the stock, the cutting unit is returned to its position to effect the cut along the region 196. After two such segments have been notched and cut, they may be joined and mated as shown in FIG. 15. Proper registration of the segments 70b is insured by mating the surfaces 198 so that the alignment notches 200 are aligned. The segments 70b may be placed, while in this relative disposition, in a jig and may be welded together while in the jig.

It is essential that the cutting blade 28 is disposed precisely along the cutter descent axis 34 in order to achieve the accuracy capabilities of the machine. If, for any reason, the cutting disc 28 is changed or a new disc is substituted, the disc 28 must be supported so that the vertical descent axis 34 passes symmetrically through the width of the new cutter blade 28. Adjustment of the position of the cutting blade 28 is provided by the arrangement shown in FIG. 16 in which the motor 50 is supported from a bracket 220 for slidable, adjustable movement along the axis of the motor 50 and disc 28 (perpendicular to the cutter descent axis 34). The adjustment of the position of the motor 50 may be made by an upstanding gauge plate 222 secured to the motor 50 and which is engaged on opposite sides by a pair of adjusting screws 224 threaded through the studs 226 secured to the bracket 220. The screws 224 may be adjusted to position the motor 50 and the blade 28 properly. Once positioned properly, the motor 50 is locked in this position to the bracket 220 by a locking bolt 226.

Figure 16:
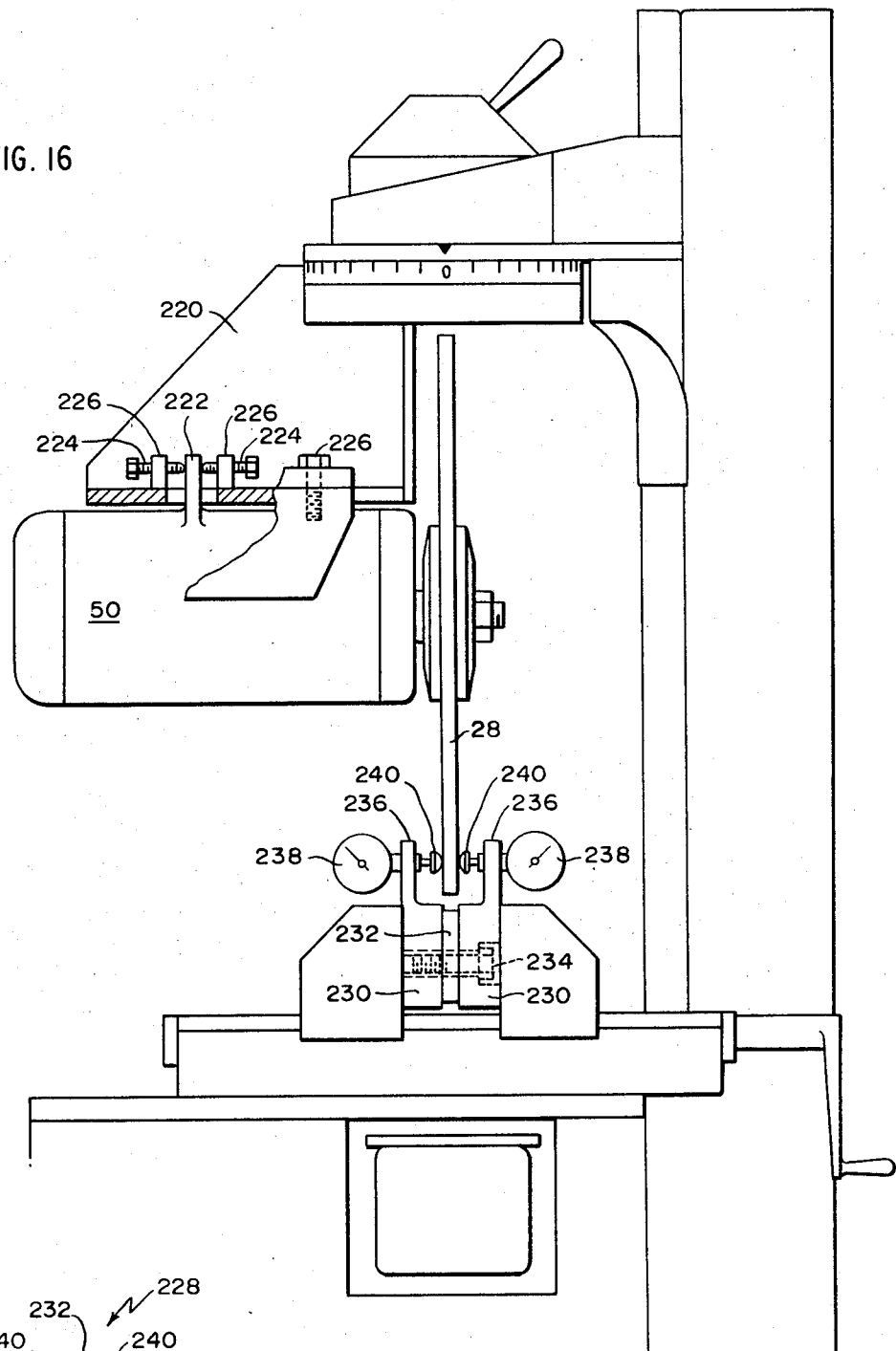
FIG. 16 is an illustration of the manner in which the cutting unit is mounted to permit adjustment of the cutting disc.
Figure 16A:
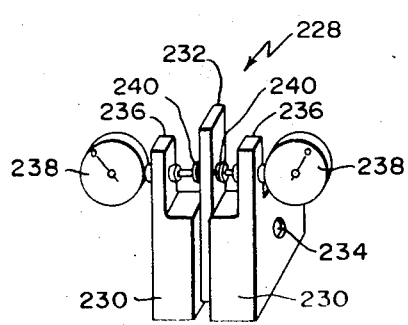
FIG. 16A is a gage device adapted to facilitate accurate centering of the cutting disc.

In order to achieve accurate positioning of the motor 50 and cutter blade 28, a gage, shown in FIG. 16a, is employed. The gage, indicated generally by the reference character 228, includes a pair of side members 230 which are spaced by a blade 232, the side members 230 and blade 232 being releasably clamped by a locking bolt 234. Each of the side members 230 has an upstanding lug 236 which supports a dial indicator 238, the indicators 238 having contact pads 240 which extend inwardly toward each other. When using the gage, the bolt 234 is loosened to permit the blade 232 to be pivoted upwardly between the pads 240 as shown in FIG. 16a. The bolt 234 then is tightened with the pads 240 bearing against opposite sides of the upstanding blade 232. The indicator bezels then are adjusted to a zero reading. The bolt 234 then is loosened to permit the blade 232 to be pivoted downwardly to an out-of-way position. The bolt then is retightened, and the gage is placed in the self-centering device 18 of the machine as shown in FIG. 16. The cutting unit 12 is oriented so that the blade 28 is parallel to the longitudinal axis 36 of the machine. The cutting unit then is urged downwardly to bring the cutting blade 28 between the pads 240 of the indicators 238. When the blade 28 is so positioned, with the pads 240 bearing against the opposite sides of the blade, proper orientation of the blade in alignment with the cutter descent axis 34 is evidenced by identical readings on both of the indicators 238. If the readings are not identical, then the blade 28 is out of alignment, and the position of the motor is adjusted as described above until the indicators 238 show identical readings. The blade then is in proper position, and the motor may be locked to the frame 220 by the bolt 226.

Figure 17:
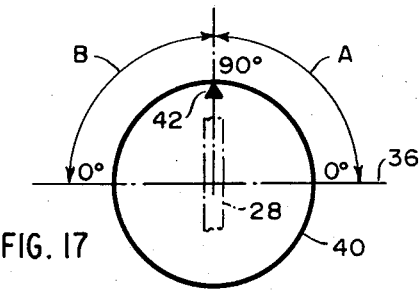
FIG. 17 is a diagrammatic view, in plan, of the quadrant designation of the scales for controlling the angle at which the cutter blade is disposed in relation to the longitudinal axis of the stock.

Another aspect of the invention relates to the technique which the operator employs while operating the machine. Unlike previous cut-off machines, the operator may cut relatively complex parts with relatively simple instructions from the designer or other person preparing the specifications for the part or parts which are to be fabricated. The simplicity of the instructions is enhanced further by the manner in which the cutter scale 40 and protractor scale 62 are marked. FIG. 17 shows, schematically, the arrangement of the scale 40 as viewed from above the machine. The scale 40 is arranged in two quadrants with different designations, such as A and B. Each of the quadrants A and B is marked from 0° to 90°, with the 90 degree indicia being common to both quadrants A and B. As shown in FIG. 17, when the 90° indicia is in registry with the fixed reference index 42, the 0° indicia in quadrants A and B will be disposed in alignment with the longitudinal axis 36. The cutting blade 28 will lie in a plane that meets the longitudinal axis 36 at right angles. By rotating the cutting unit 12 along quadrants A and B, the cutting disc 28 may be oriented to meet the longitudinal axis at any angle. When instructing the operator to make a particular cut in a workpiece, he is instructed to pivot the cutting unit 12 to a particular quadrant and angle between 0° and 90° in that quadrant. This positions the cutting blade 28 and the intended orientation and requires no calculations on the part of the operator. Any calculations which might necessarily have been made may be made by the designer or other person preparing the instructions for the operator.

Figure 18:
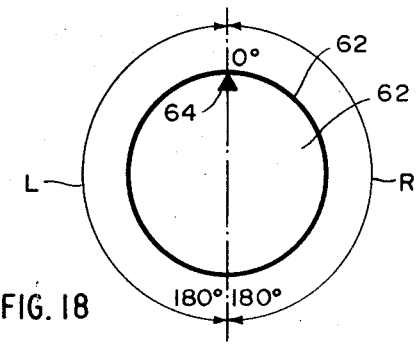
FIG. 18 is a diagrammatic view, as seen along the longitudinal axis of the machine, of the protractor and the segmented scale associated with the protractor.

FIG. 18 shows, schematically, the arrangement of the protractor scale 62 about the protractor 60 as viewed along the longitudinal axis 36 looking in a forward direction. The scale 62 is divided into a pair of semicircular segments L and R, each of which circumscribes an arc of 180°. After the stock has been secured in the chuck 22 and the protractor 60 has been secured with its 0° indicia in registry with the fixed reference index 64, the angular position of the stock 16 may be controlled by simple instructions to the operator which specifies that the chuck 22 should be rotated into a particular angle setting on one or the other section. This arrangement also avoids any mathematical calculations on the part of the operator and provides for greatly simplified instruction.

Instructions for the operator relating to the length of the segment which projects beyond the cutting blade 28 also is simplified, as described above, in that the operator need only be instructed to advance the carriage 26 a particular distance as read out on the linear measuring device. The operator sets the linear measuring device 106 and tape measure to the "0" setting and then simply advances the carriage 26 by the crank 102 for the required distance. All calculations are made by the designer or skilled person and the operator is only required to perform the relatively simple task of advancing the carriage 26 the required distance as measured by the linear measuring device 106.

One of the factors which must be considered when designing a part and instructing the operator is that allowances must be made for the kerf corresponding to the width of the cutting disc 28 when specifying the extent of forward advancement of the chuck 22 and carriage 26 along the rail. For example, when the cut is made at an angle of 90° to the longitudinal axis 36 of the stock 16, the kerf allowance is equal to the width of the cutting disc. As the angle of the cut is reduced, however, the kerf allowance must be increased, the increase being a function of the sine of the angle of the cut.

It should be understood that the foregoing description of the invention is intended merely to be illustrative thereof and that other embodiments and modifications will be apparent to those skilled in the art without departing from the spirit.

Having thus described the invention what I desire to claim and secure by Letters Patent is:

1. An apparatus for cutting a segment from elongate stock at a cutting station, said stock having a longitudinal axis, comprising, in combination:

a frame having a support post secured thereto;

a cutting unit mounted to said post for movement toward and away from said cutting station and along a cutter descent axis which passes through said cutting station;

a rail extending from said frame in a direction that is substantially normal to said cutter descent axis, said rail including a generally flat, elongate rail plate;

a carriage including wheels rotatably mounted thereto for supporting said carriage for movement along the surface of said rail plate toward and away from said cutting station, said carriage further including means engagable with the side edges of said rail plate for maintaining and guiding said carriage along said rails;

means mounted to said carriage for supporting the trailing end of said stock so that the longitudinal axis of said stock passes through said cutting station and intersects, normally, said cutter descent axis at said cutting station;

means for releasably locking said carriage to said rail to enable a selected region of said stock to be accurately positioned and located at said cutting station in readiness to be cut by said cutting unit;

means mounted to said carriage for cooperation with said rail for indicating the extent of linear advancement of said carriage along said rail and toward said cutting station from a predetermined, more rearward location along said rail, said indicating means comprising:

a tape measure unwindingly secured to said carriage and having a free end;

connector means secured to said free end of said tape measure for firm, releasable attachment to said rail;

a fixed reference index disposed on said carriage and associated with said tape measure to register with a standard indicia of said tape measure when said tape is fully rewound; and said indicating means being capable of being reset to a standard reference indication when at said predetermined rearward location whereby the extent of linear advancement may be read directly from said indicating means thus eliminating calculation in order to determine the extent of advancement.

2. An apparatus as defined in claim 1 wherein said rail is magnetically permeable and wherein said connector means comprises a magnet.

3. An apparatus as defined in claim 1 wherein said indicating means further comprises:
a high resolution linear measuring device mounted to said carriage and having a friction wheel engagable with the edge of said rail plate, said friction wheel being associated with said indicator to provide a measurement of the extent of linear advancement of said carriage along said rail, said indicator being adapted to be reset to a standard indication before advancement of said carriage to provide a direct readout of the extent of linear advancement of said carriage along said rail.

4. An apparatus for cutting a segment from elongate stock at a cutting station, said stock having a longitudinal axis, comprising, in combination:
a frame having a supporting post secured thereto;
a cutting unit mounted to said post for movement toward and away from said cutting station and along a cutter descent axis which passes through said cutting station;
a rail extending from said frame in a direction that is substantially normal to said cutter descent axis, said rail including a generally flat, elongate rail plate;
a carriage including wheels rotatably mounted thereto for supporting said carriage for movement along the surface of said rail plate toward and away from said cutting station, said carriage further including means engagable with the side edges of said rail plate for maintaining and guiding said carriage along said rails;
means mounted to said carriage for supporting the trailing end of said stock so that the longitudinal axis of said stock passes through said cutting station and intersects, normally, said cutter descent axis at said cutting station;
means for releasably locking said carriage to said rail to enable a selected region of said stock to be accurately positioned and located at said cutting station in readiness to be cut by said cutting unit; and
said means for releasably locking said carriage to said rail comprising:
a pair gripping plates pivotally secured to opposite sides of said carriage and depending downwardly therefrom below the edges of said rail blade; and
a locking bolt extending transversely between said carriage and said rail plate and being in threaded engagement with said gripping plate whereby said bolt may be rotated to swing said gripping plate toward the edges of said rail plate to lock said gripping plates thereto.

5. An apparatus for cutting segments from elongate stock at a cutting station, said stock having a longitudinal axis, comprising, in combination:
a frame having a support post secured thereto;
a cutting unit mounted to said post for movement in a direction that is toward and away from said cutting station and along a cutter descent axis which passes through said cutting station and along a cutter descent axis which passes through said cutting station;
a rail extending from said frame along a direction substantially normal to said cutter descent axis;
a carriage supported on said rail for movement along said rail toward and away from said cutting station;
means mounted to said carriage for supporting a trailing end of said stock so that the longitudinal axis of said stock passes through said cutting station and intersects normally said cutter descent axis at said cutting station;
means for releasably locking said carriage to said rail to enable a selected region of said stock to be located at said cutting station in readiness for a cutting operation;
means mounted to said carriage for cooperation with said rail for indicating the extent of linear advancement of said carriage toward said cutting station from a predetermined, rearward location along said rail, said indicating means being so constructed and arranged as to be capable of being reset to a standard reference indication when at said predetermined rearward location whereby calculation to determine the extent of advancement of said carriage and said stock is eliminated;
said indicating means comprising:
a tape measure unwindingly secured to said carriage and having a free end;
connector means secured to the free end of said tape measure for firm, releasable attachment to said rail; and
a fixed reference index disposed on said carriage and associated with said tape measure, said reference index being arranged to register with a standard setting on said tape when said tape is fully rewound.

6. An apparatus as defined in claim 5 wherein said rail is of magnetically permeable material and wherein said connector means comprises a magnet.

7. An apparatus as defined in claim 5 wherein said indicator means further comprises:
a high resolution linear measuring device mounted to said carriage and having a friction wheel engagable with said rail, said friction wheel being associated with an indicator to provide an indication of the extent of linear advancement of said carriage along said rail, said indicator being adapted to be set to a standard reference before advancement of said carriage along said rail to provide a direct readout of the extent of carriage advancement along said rail.

* * * * *